United States Patent
Cohen et al.

(10) Patent No.: US 7,292,753 B2
(45) Date of Patent: Nov. 6, 2007

(54) DUAL CORE CORRUGATED BRAGG GRATING

(75) Inventors: Oded Cohen, Gedera (IL); Richard Jones, Santa Clara, CA (US); Doron Rubin, Givataim (IL); Alex Fang, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/313,381

(22) Filed: Dec. 21, 2005

(65) Prior Publication Data

US 2007/0140619 A1 Jun. 21, 2007

(51) Int. Cl.
*G02B 6/34* (2006.01)
*G02B 6/10* (2006.01)

(52) U.S. Cl. .................. 385/37; 385/129; 385/131
(58) Field of Classification Search ........... 385/24, 385/37, 129–132
See application file for complete search history.

(56) References Cited

U.S. PATENT DOCUMENTS

| 6,428,944 | B1 * | 8/2002 | Alibert et al. ............ 430/321 |
| 7,016,586 | B2 * | 3/2006 | Zoorob et al. ............ 385/129 |
| 7,088,877 | B2 * | 8/2006 | Liu et al. ................. 385/10 |
| 2003/0031413 | A1 * | 2/2003 | Kimerling et al. ........ 385/37 |
| 2005/0161789 | A1 * | 7/2005 | Towle et al. ............. 257/680 |

* cited by examiner

*Primary Examiner*—Hemang Sanghavi
(74) *Attorney, Agent, or Firm*—Blakely, Sokoloff, Taylor & Zafman LLP

(57) ABSTRACT

An apparatus comprising a first core layer having a first thickness and a first refractive index; a second core layer formed on the first core layer, the second core layer having a second thickness and a second refractive index; and a grating formed at the interface between the first core layer and the second core layer. Corresponding process and system embodiments are disclosed and claimed.

14 Claims, 5 Drawing Sheets

DUAL CORE CORRUGATED BRAGG GRATING

TECHNICAL FIELD

The present invention relates generally to Bragg gratings and in particular, but not exclusively, to a two-core corrugated Bragg grating.

BACKGROUND

The need for fast and efficient optical-based technologies is increasing as Internet data traffic growth rate is overtaking voice traffic and pushing the need for fiber optical communications. Transmission of multiple optical channels over the same optical fiber in a wavelength-division multiplexing (WDM) system provides a simple way to use the unprecedented capacity (signal bandwidth) offered by fiber optics. Commonly used optical components in the system include WDM transmitters and receivers, optical filters such as diffraction gratings, thin-film filters, fiber Bragg gratings, arrayed-waveguide gratings, optical add/drop multiplexers, and tunable lasers.

Bragg gratings integrated with waveguides are especially useful in optical systems because they can be used as transmission or reflection filters, as multiplexers/de-multiplexers in WDM communication systems, or to stabilize the spectra as part of the laser's cavity in a cavity-type laser. One of the common ways of integrating Bragg grating in a waveguide is to have the desired periodicity as surface corrugation at the interface between the core and the cladding of the waveguide. The core has a different refractive index ($n_{core}$) than the cladding ($n_{cladding}$), so that the optical mode traveling along the waveguide is affected by these surface corrugations as a periodic function of the waveguide's effective refractive index. Bragg gratings formed at the interface between core and cladding, however, have only a limited number of degrees of freedom and therefore a limited number of design parameters with which a designer can work to design a Bragg grating for a particular application. As a result, this type of Bragg grating has limited design flexibility.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of an apparatus and method for a dual core corrugated Bragg grating are described herein. In the following description, numerous specific details are described to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail but are nonetheless encompassed within the scope of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 1A:
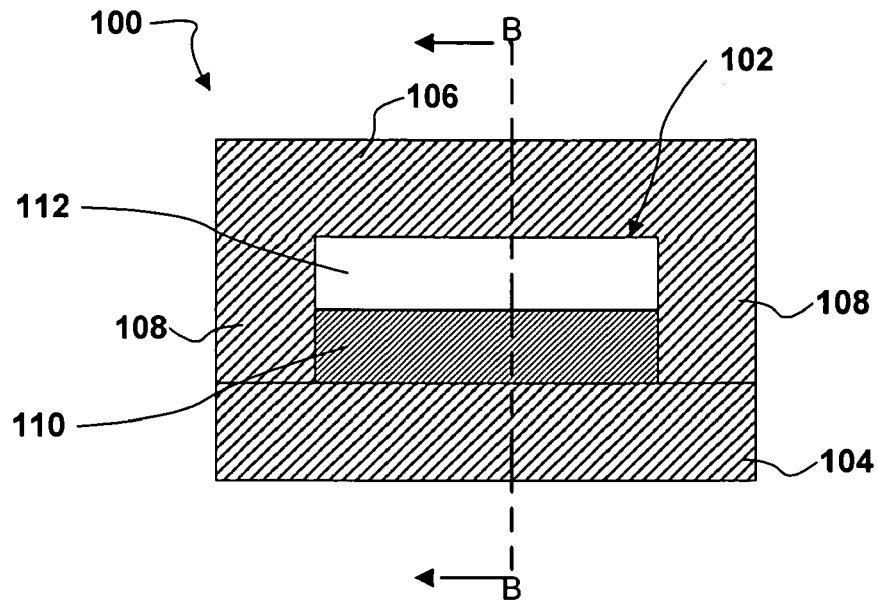
FIG. 1A is a cross-sectional front elevation of an embodiment of a Bragg grating according to the present invention.
Figure 1B:
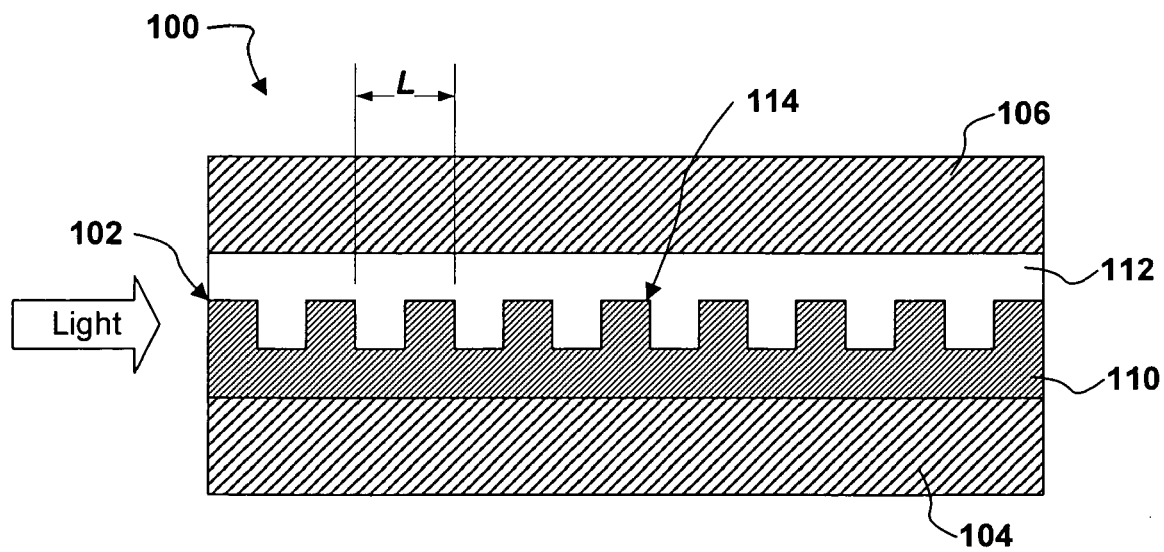
FIG. 1B is a cross-sectional side elevation of the embodiment of a Bragg grating shown in FIG. 1A, taken substantially along the section line B-B.

FIGS. 1A and 1B together illustrate the construction of a waveguide 100 integrating a Bragg grating according to the present invention. The waveguide 100 includes a core 102 surrounded by a bottom cladding layer 104, a top cladding layer 106, and side cladding layers 108. In the illustrated embodiment, the core 102 includes a first core layer 110 and a second core layer 112, with a corrugation or grating 114 formed at the interface between first core layer 110 and second core layer 112.

The first core layer 110 has a refractive index $n_1$, while the second core layer 112 has a refractive index $n_2$. To create index contrast at the grating 114, $n_2$ should not be equal to $n_1$, but the ratio of $n_1$ to $n_2$ will depend on the application in which the particular waveguide will be used. In some embodiments $n_1$ can be greater than $n_2$, while in other embodiments $n_1$ can be less than $n_2$. In one embodiment of waveguide 100, the first core layer 110 and the second core layer 112 are both made using silicon oxynitride (nominally SiON, although the relative proportions of oxygen and nitrogen can vary). Despite being made of the same material, the refractive index difference between first core layer 110 and second core layer 112 can be varied over a wide range (1.45-2.0 in one embodiment, although larger or smaller ranges can be achieved in other embodiments) by controlling the processing conditions. For example, in silicon oxynitride the refractive index can be controlled by altering the amounts of nitrogen and/or oxygen. In still other embodiments, first core layer 110 and second core layer 112 need not be made of the same materials, and in still other embodiments materials other than silicon oxynitrides—for example, silicon oxide (nominally $SiO_2$), silicon nitrides (nominally SiN), doped silicon and the like—can be used.

The corrugation or grating 114 is formed at the interface between first core layer 110 and second core layer 112. In the embodiment shown, the grating 114 has a square profile with a constant period L, but in other embodiments (see FIGS. 3A-3C) it can have a different profile and/or a period that varies over the length of the grating. Generally, the profile of grating 114 and its period distribution will affect the performance of the waveguide, and selection of these characteristics will depend on the application in which the waveguide 100 will be used. The relative refractive index difference at the grating is another important parameter that determines the grating coupling strength. In surface corrugated designs this parameter is determined by the core-to-cladding index ratio, but changing this ratio also affects the optical mode size and so will have significant impact on the whole planar circuit design. Introducing a core 102 including core layers with different refractive indices makes it possible to design for various grating effectiveness with a small effect on the optical mode shape and other system parameters.

The bottom cladding 104, top cladding 106 and side cladding 108 surround the entire core 102. The material of which bottom cladding 104, top cladding 106 and side cladding 108 are made has a refractive index $n_c$. To assure total internal reflection within the core 102, the refractive index $n_c$ of the cladding should generally be smaller than both the refractive index $n_1$ of first core layer 110 and the refractive index $n_2$ of second core layer 112. In some embodiments, bottom cladding 104, top cladding 106 and side cladding 108 are made of the same material and have substantially the same refractive index $n_c$. In other embodiments, it is possible for bottom cladding 104, top cladding 106 and side cladding 108 to have different indices of refraction, provided that the index of refraction $n_c$ of a given part of the cladding is smaller than the refractive index ($n_1$ or $n_2$) of the parts of the core 102 with which the cladding is in contact. In one embodiment of the waveguide 100, bottom cladding 104, top cladding 106 and side cladding 108 are all made of silicon oxide (nominally $SiO_2$), but of course in other embodiments the bottom cladding, top cladding and side cladding can be made of different materials. In still other embodiments, the different parts of the cladding can be made of the same material but treated differently to alter its refractive index to be compatible with the core layer it is in contact with.

Figure 2A:
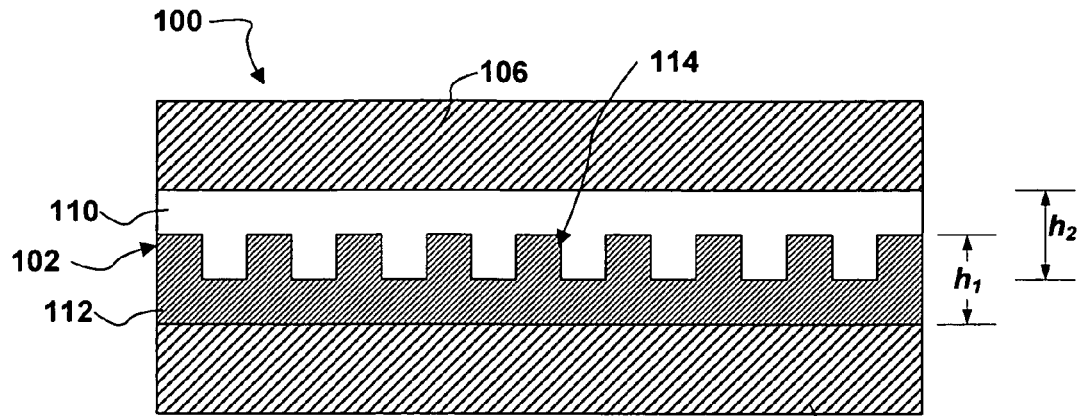
FIG. 2A is a cross-sectional view of an alternative embodiment of a Bragg grating according to the present invention.
Figure 2B:
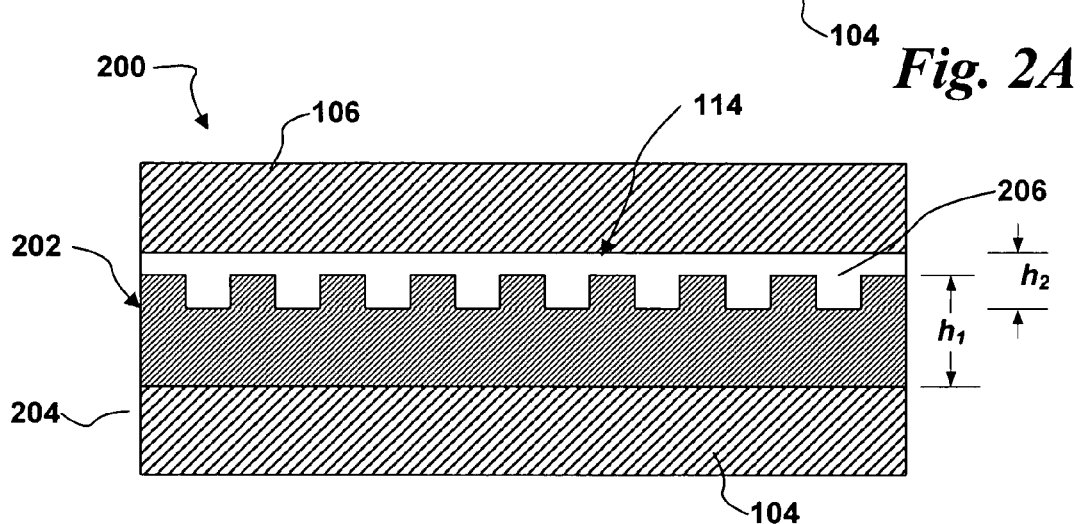
FIG. 2B is a cross-sectional view of another alternative embodiment of a Bragg grating according to the present invention.
Figure 2C:
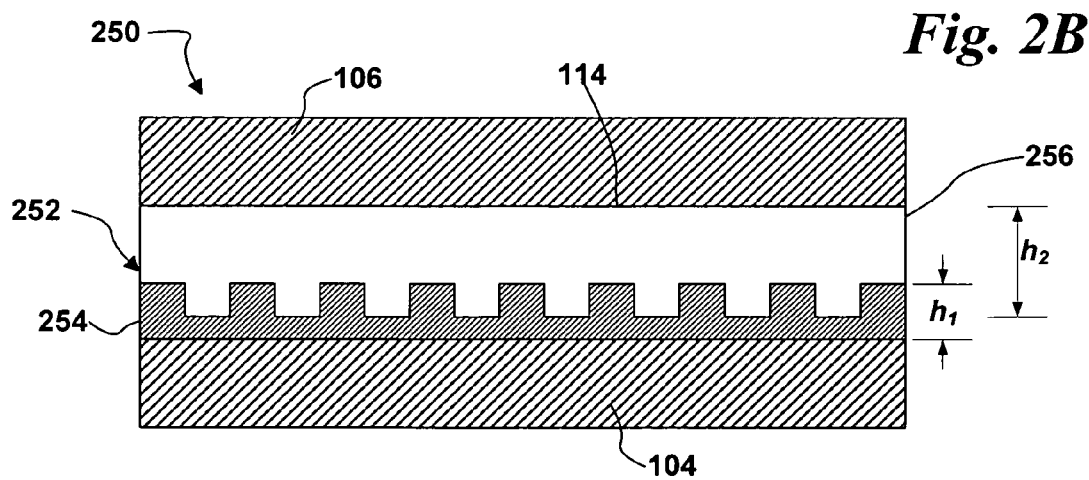
FIG. 2C is a cross-sectional view of yet another alternative embodiment of a Bragg grating according to the present invention.

FIGS. 2A-2C illustrate alternative embodiments of waveguides according to the present invention; in these embodiments, the position of the grating can be moved to any position within the waveguide core by selecting the thickness $h_1$ of the first core layer and the thickness $h_2$ of the second core layer. FIG. 2A illustrates the waveguide 100 shown in FIG. 1A, in which the thicknesses $h_1$ and $h_2$ are chosen to position grating 114 so that it is substantially centered within core 102. FIG. 2B illustrates another embodiment of a waveguide 200 in which the thickness $h_1$ of first core layer 204 is larger than the thickness $h_2$ of second core layer 206, placing the grating 114 closer to the top of the core 202 than to the bottom of the core. FIG. 2C illustrates another embodiment of a waveguide 250 in which the thickness $h_1$ of first core layer 254 is smaller than the thickness $h_2$ of second core layer 256, placing the grating 114 closer to the bottom of the core 252 than to the top of the core.

Freedom to position grating 114 at different positions within the core as shown in FIGS. 2A-2C can affect the grating coupling strength, since the grating position directly correlates to the interaction of the optical mode field with the grating corrugations. In some waveguide applications, the strongest optical field is at the center of the core; for these applications a centered grating or corrugation may be preferable. The additional degrees of freedom provided by the ability to change the position of the grating within the core and the ability to choose the relative refractive index difference at the grating allows one optimize the index contrast of the grating ($n_1$-$n_2$), while retaining the high index contrast of the waveguide, allowing small bend radii and compact device design.

Figure 3A:
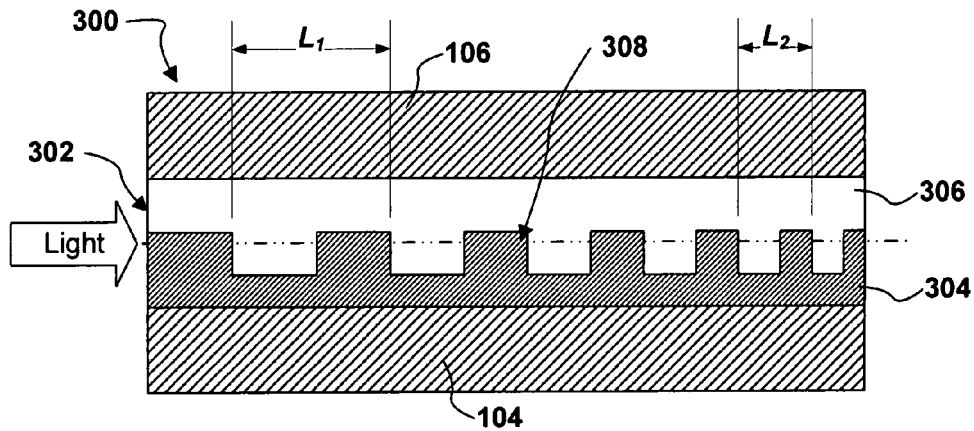
FIG. 3A is a cross-sectional view of an alternative embodiment of a Bragg grating according to the present invention.
Figure 3B:
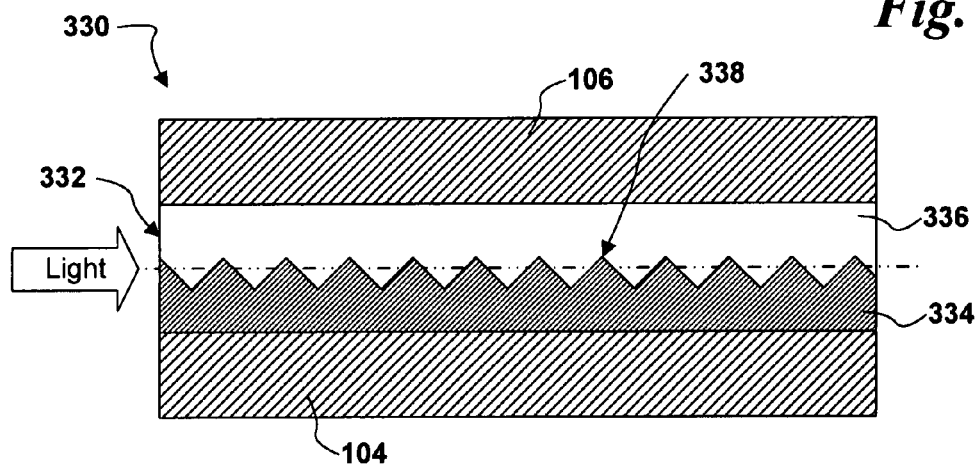
FIG. 3B is a cross-sectional view of another alternative embodiment of a Bragg grating according to the present invention.
Figure 3C:
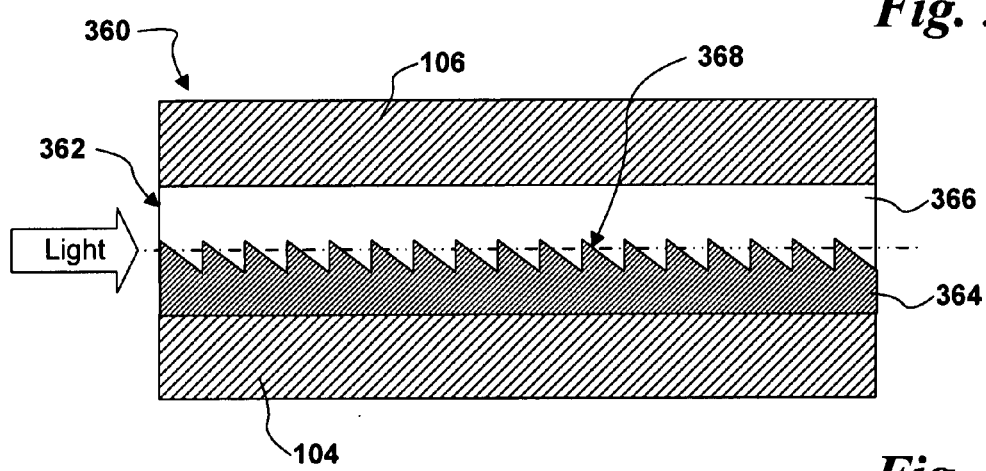
FIG. 3C is a cross-sectional view of yet another alternative embodiment of a Bragg grating according to the present invention.

FIGS. 3A-3C illustrate various alternative embodiments of waveguides according to the present invention. FIG. 3A illustrates an embodiment of a waveguide 300 having a core 302 in which the grating 308 is "chirped," meaning that the grating period changes along the length of the grating. Thus, at the beginning grating 308 has a period $L_1$ and toward the end it has smaller period $L_2$. In other embodiments with a chirped grating, however, the period can increase over the length of the grating instead of decreasing as shown. In addition, the change in grating period need not be continuous and monotonic as shown, but can instead be discrete and/or non-monotonic. The position of the chirped grid within the core 302 can also be adjusted as shown in FIGS. 2A-2C by adjusting the thicknesses of first core layer 304 and second core layer 306.

FIG. 3B illustrates an embodiment of a waveguide 330 having a core 332 in which the grating 338 has a sawtooth profile instead of a square profile as previously shown. The illustrated embodiment shows a sawtooth profile with constant period, but in other embodiments the period can be varied to create a chirped sawtooth grating. Moreover, as with waveguide 300 the position of grating 338 within the core 332 can also be changed by adjusting the thicknesses of first core layer 334 and second core layer 336.

FIG. 3C illustrates an embodiment of a waveguide 360 having a core 362 in which the grating 368 has a blazed profile instead of a square profile or a sawtooth profile as previously shown. The illustrated embodiment shows a blazed profile with constant period, but in other embodiments the period can be varied to create a chirped blazed grating. Moreover, as with waveguide 300 the position of the grating 368 within the core 362 can also be changed by adjusting the thicknesses of first core layer 364 and second core layer 366. Of course, many other grating profiles besides those illustrated can be used, depending on the application to which the waveguide will be put.

Figure 4:
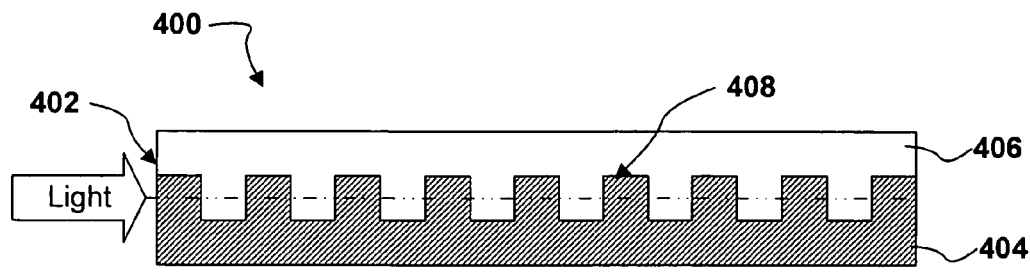
FIG. 4 is a cross-sectional view of another alternative embodiment of a Bragg grating according to the present invention.

FIG. 4 illustrates yet another alternative embodiment of a waveguide 400 according to the present invention. Like waveguide 100 shown in FIGS. 1A-1B, waveguide 400 includes a core 402 that has a first core layer 404 and a second core layer 406. Waveguide 400 also includes a grating 408 formed at the interface of first core layer 404 and second core layer 406. Unlike embodiments discussed above, in waveguide 400 the core 402 is not surrounded by cladding. In some embodiments no cladding is necessary: depending on the waveguide's application and the materials chosen for core layers 404 and 406, the differences between the refractive index of air surrounding core 402, the refractive index $n_1$ of first core layer 404 and the refractive index $n_2$ of second core layer 406 can be such that total internal reflection still occurs within the core. In effect, then, the air surrounding core 402 behaves as cladding and no additional cladding is necessary.

Figure 5:
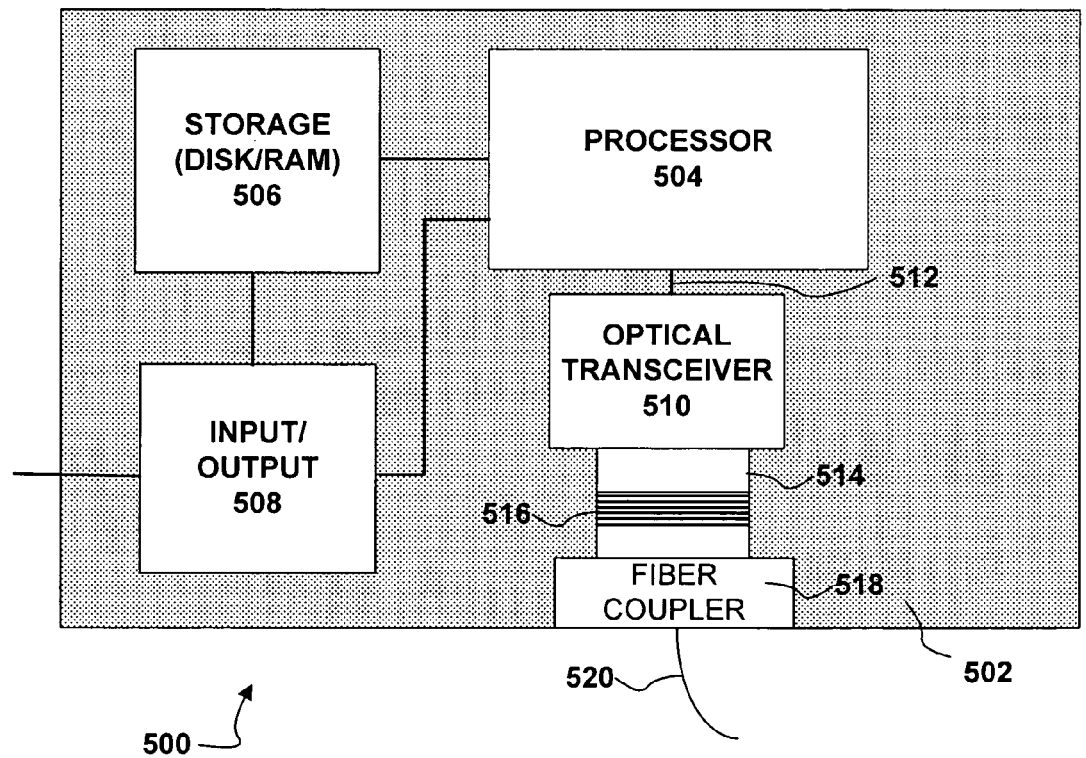
FIG. 5 is a schematic plan view of an embodiment of a system according to the present invention.

FIG. 5 illustrates an embodiment of an optical system 500 including the present invention. The system 500 comprises a processor 504 mounted to a substrate 502. Processor 504 is coupled to a storage device 506, which in various embodiments can be a memory such as a dynamic random access memory (DRAM), synchronous dynamic random access memory (SDRAM), flash random access memory (RAM), and the like. Processor 504 is also coupled to an input/output device 508 that allows the processor to send and receive commands and data to and from devices outside the system. Although shown in this embodiment as electrically coupled to the processor 504, in alternative embodiments the storage unit 506 and input/output unit 508 can be optically coupled to the processor.

Processor 504 is also coupled by a waveguide 512 to optical transceiver 510 mounted on substrate 502. In one embodiment, optical transceiver 510 is a flip-chip die including optically active areas such as optical sources, optical detectors, coupling elements, and the like. Optical transceiver 510 is coupled to fiber coupler 518 by waveguide 514. Fiber coupler 518 is in turn coupled to optical fiber 520, which carries optical signals to and from an external optical package (not shown). Waveguide 514 includes a Bragg grating 516 that, in this embodiment, acts as a filter and can be any of the grating embodiments discussed above.

In one mode of operation of the system 500, the processor reads instructions or data from the storage unit 506 or receives instructions or data from the input/output unit 508. The processor performs some operation on the data or instructions and optically transmits the data or instructions to optical transceiver 510 via a signal transmitted through line 512. Optical transceiver 510 can then perform further operations on the signal, after which it transmits the signal through waveguide 514 and grating 516 to fiber coupler 518, where the signal is launched into optical fiber 520 so that it can be carried to another optical transceiver (not shown). Acting as a filter, grating 516 extracts extraneous wavelengths of light from the signal before it is launched into fiber 520 at fiber coupler 518.

In a second mode of operation, optical transceiver 510 receives a signal through optical fiber 520 and fiber coupler 518. Optical transceiver 510 then transmits the data in the signal to processor 504, which can then store this information in the storage device 506 or sends it to the input/output device 508.

Figure 6A:
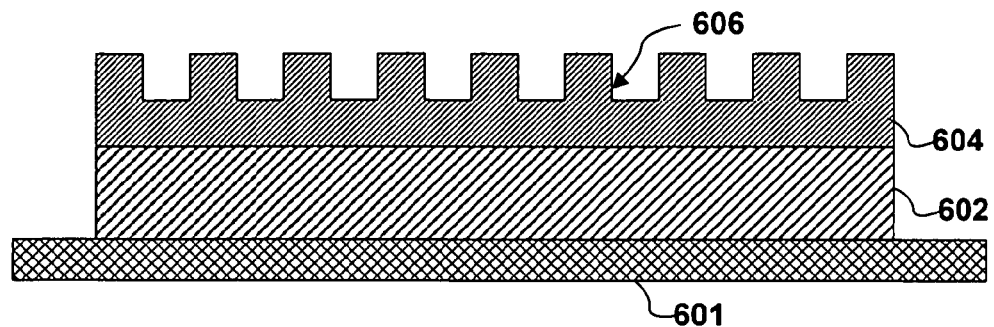
FIGS. 6A-6C are cross-sectional views of an embodiment of a process for building an embodiment of a Bragg grating such as the one shown in FIGS. 1A-1B.
Figure 6B:
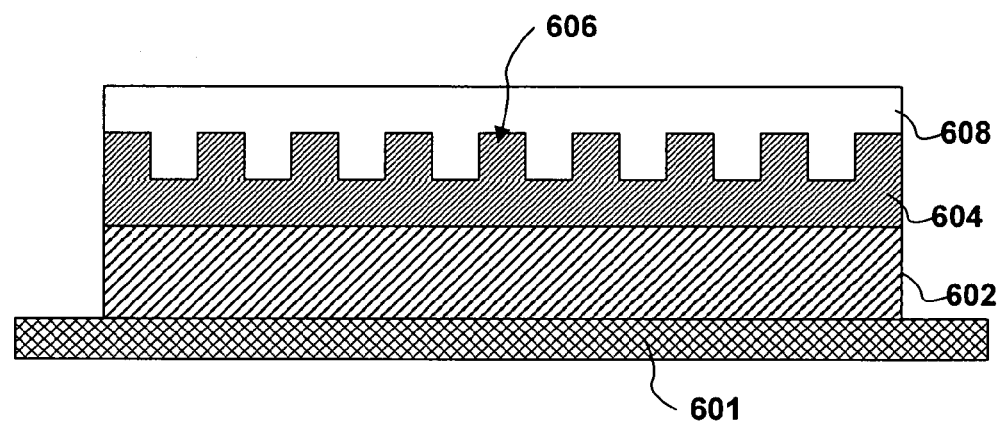
Figure 6C:
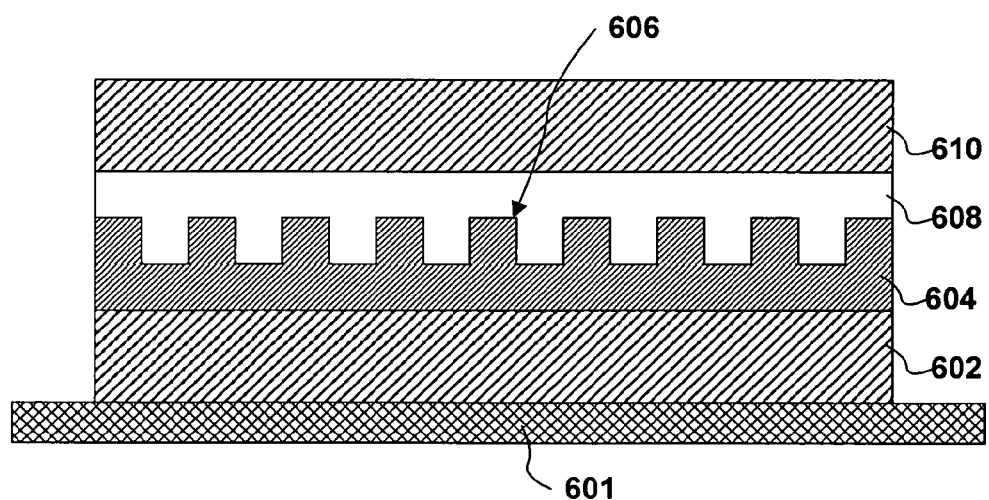

FIGS. 6A-6C illustrate an embodiment of a process for building a waveguide such as waveguide 100 shown in FIG. 1A. FIG. 6A shows the initial part of the process in which a layer of cladding 602 is deposited on a substrate 601. A first core layer 604 is then deposited on the cladding 602. Both cladding layer 602 and first core layer 604 can be deposited by various methods, including physical vapor deposition (PVD) methods such as thermal evaporation or sputtering, chemical vapor deposition (CVD) methods in which the solid product of a chemical reaction is deposited on the surface of the substrate, and atomic layer deposition (ALD) methods. Other methods not discussed here, as well as variations of these methods, such as plasma-enhanced CVD, can be used as well. The choice of method for depositing cladding layer 602 and first core layer 604 will generally depend on the particular material being used. For example, in an embodiment where first core layer 604 is silicon nitride or silicon oxynitride is rich with nitrogen, it can be deposited in its liquid phase via PVD methods. In other embodiments using silicon oxide or silicon oxynitride rich with oxygen, plasma-enhanced CVD may need to be used. Once first core layer 604 is deposited, surface corrugations 606 are lithographically patterned and etched in its surface.

FIG. 6B illustrates the next part of the process. Starting with the build-up shown in FIG. 6A, a second core layer 608 is deposited on the corrugated surface of first core layer 604. As with cladding layer 602 and first core layer 604, the choice of method for depositing second core layer 608 can be any of the methods previously discussed, or some other method not discussed herein. The choice of method will generally depend on the particular material being used. After deposit of second core layer 608, first core layer 604 and second core layer 608 are lithographically patterned and etched to create the waveguide, as shown in FIGS. 1A-1B.

FIG. 6C illustrates the next part of the process. Starting with the build-up shown in FIG. 6B, a second cladding layer 610 is deposited on the surface of second core layer 610. Although not shown in this particular, the second cladding layer 610 can also cover the sides of the waveguide, resulting in the waveguide illustrated in FIGS. 1A and 1B. As with cladding layer 602 and first core layer 604, the choice of method for depositing second core layer 608 will generally depend on the particular material being used. After deposit of core layer 610, its top surface can be planarized.

The above description of illustrated embodiments of the invention, including what is described in the abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

The invention claimed is:

1. An apparatus comprising:
    a first core layer having a first thickness and a first refractive index;
    a second core layer formed on the first core layer, the second core layer having a second thickness and a second refractive index, wherein a grating is formed by the interface between the first core layer and the second core layer; and
    a cladding layer surrounding the first core layer and second core layer.

2. The apparatus of claim 1 wherein the first refractive index has a different value than the second refractive index.

3. The apparatus of claim 2 wherein the first core layer and the second core layer are made up of a same material that is differently treated to create a difference in refractive index.

4. The apparatus of claim 1 wherein the first core layer and the second core layer are made of different materials.

5. The apparatus of claim 1 wherein the first thickness is different than the second thickness.

6. The apparatus of claim 1 wherein a refractive index of the cladding is less than the first refractive index and the second refractive index.

7. A system comprising:
    a substrate having thereon an optical die, a processor coupled to the optical die, and an SDRAM memory coupled to the processor; and a waveguide formed on the substrate and extending from the optical die to another optical die, the waveguide comprising:
- a first core layer having a first thickness and a first refractive index,
- a second core layer formed on the first core layer, the second core layer having a second thickness and a second refractive index, wherein a grating is formed by the interface between the first core layer and the second core layer, and
- a cladding layer surrounding the first core layer and second core layer.

8. The system of claim 7 wherein the first refractive index has a different value than the second refractive index.

9. The system of claim 7 wherein the first thickness is different than the second thickness.

10. The system of claim 7 wherein a refractive index of the cladding is less than the first refractive index and the second refractive index.

11. An apparatus comprising:
- a first core layer having a first thickness, a first refractive index, and a surface having a first pattern of corrugations defined therein;
- a second core layer having a second thickness, a second refractive index, and a surface having a second pattern of corrugations defined therein, wherein the first pattern of corrugations and the second pattern of corrugations mesh together to form a grating at the interface of the first core layer and the second core layer; and
- a cladding layer surrounding the first core layer and second core layer.

12. The apparatus of claim 11 wherein the first refractive index has a different value than the second refractive index.

13. The apparatus of claim 11 wherein the first pattern of corrugations comprises a square profile, a sawtooth profile or a blazed profile.

14. The apparatus of claim 11 wherein the first pattern of corrugations has a constant period.

* * * * *